United States Patent [19]

Ward et al.

[11] 3,936,580

[45] Feb. 3, 1976

[54] ELECTRICALLY CONDUCTIVE GLASSLIKE FILMS ON GLASS OR CERAMIC SURFACES FROM ALUMINUM AND PLUMBITE-TREATED CELLULOSICS

[75] Inventors: Truman L. Ward; Ruth R. Benerito, both of New Orleans, La.

[73] Assignee: The United States of America as represented by the Secretary of Agriculture, Washington, D.C.

[22] Filed: Aug. 22, 1974

[21] Appl. No.: 499,688

[52] U.S. Cl. .............. 428/446; 428/450; 428/452; 428/537; 428/538; 427/108; 427/123; 264/61
[51] Int. Cl.² ..................... B32B 9/04; B32B 9/06
[58] Field of Search .......... 264/61, 62; 156/155, 90; 117/211, 213; 427/108, 123; 428/446, 450, 452, 537, 538

[56] References Cited
UNITED STATES PATENTS

| | | | |
|---|---|---|---|
| 2,389,419 | 11/1945 | Deyrup et al. | 264/61 |
| 2,399,313 | 4/1946 | Ballard | 264/61 |
| 3,004,875 | 10/1961 | Lytle | 117/211 |
| 3,019,136 | 1/1962 | Auffendorde | 117/211 |
| 3,505,139 | 4/1970 | Wentworth | 264/61 |

*Primary Examiner*—Michael F. Esposito
*Attorney, Agent, or Firm*—M. Howard Silverstein; Max D. Hensley

[57] ABSTRACT

Electrically conductive glasslike films have been produced on the surface of various types of glass and porcelain by heating plumbite-treated cellulosics while one surface of the plumbite-treated cellulosic was in contact with glass or porcelain and the other surface of the cellulosic was covered with either aluminum foil or powder. The heating was carried out in a closed oven with a limited availability of oxygen. The various glasses and ceramics treated by the process of this invention were imparted a conductive coating or surface which appeared to be rigid with respect to abrasion and grey with respect to coloration.

4 Claims, No Drawings

ELECTRICALLY CONDUCTIVE GLASSLIKE FILMS ON GLASS OR CERAMIC SURFACES FROM ALUMINUM AND PLUMBITE-TREATED CELLULOSICS

This invention relates to lead-containing glasslike coatings. Specifically, this invention relates to a means of imparting to glass and ceramic surfaces a hard, glassy, grey, electrically conductive coating or surface. More specifically, this invention relates to electrically conductive coatings which can be imparted to high silicon content glass or ceramic surfaces, these coatings being produced by the reaction of plumbite-treated cellulosics, metallic aluminum, and the high silicon content glass or porcelain surface.

One object of this invention is to provide a process for adding an electrically conductive film to the surface of a high silicon content glass or porcelain.

A second object of this invention is to provide a process for fusing an electrically conductive film to the surface of a high silicon content glass or ceramic surface so that the film will be hard and resistant to removal by abrasion or cutting.

BACKGROUND AND PRIOR ART OF THE INVENTION

Investigation has shown that heating either potassium or sodium plumbite-treated cotton or other cellulosics in fabric or sheet form while the treated cellulosic is in contact with a glass or ceramic and the heating taking place in a limited oxygen atmosphere such as an oven at about 600° to 700°C. for about 60 minutes produces a hard glasslike, electrically non-conductive film. The sodium plumbite is preferred mainly because of its availability.

Further investigation has revealed that a thin layer of metallic aluminum against the exposed surface of the plumbite-treated cellulosic in the above procedure results in a dull grey, glassy hard film that is electrically conductive, and because of its hardness is resistant to damage by cutting or abrading. The thin layer of aluminum may be provided as metallic foil or as particles for use in the process of this invention.

Investigation has shown that the assembly of aluminum foil or powder over plumbite-treated cellulosic which is over glass or porcelain, must be placed in the oven before the oven temperature exceeds about 200°C.

Copper and tin did not act in a manner similar to the aluminum in the process. Some variation in electrical conductivity of the coating can be achieved by varying the lead content of the plumbite-treated cellulose or by varying the amount of aluminum. As an example, a more conductive film was formed by use of aluminum as foil than as powder. A film made using plumbite-treated cellulose with 8% lead and aluminum foil was more conductive (zero ohm resistance) than a film made using plumbite-treated cellulose with 24% lead and identical aluminum foil (50 ohms resistance). The conductivity of the film can also be varied by treating the good conducting film as initially formed with a strong acid such as concentrated nitric acid. Immersing the film in concentrated nitric acid for a period of 8 hrs, lowers the conductivity such that the resistance is 2600 ohms. Measurement of conductivity of the films of the invention was made by measuring the electrical resistance (in ohms) between two points 1 inch apart on the film. The resistance of the film could be varied so that the conductivity was either nearly perfect (zero ohms) or moderate (several thousand ohms) per inch of surface measured between points one inch apart on a film 0.0015 inches thick. Anyone skilled in the art of electrical conductors and the use of same will understand the inverse relationship of conductivity and resistance.

Treatment of the cellulosic material used an alkaline aqueous solution of sodium plumbite prepared by saturating 12% sodium hydroxide in water with lead monoxide powder and allowing it to stand for 24 hours prior to filtration. This procedure is not a part of the process of this patent and is known from prior art.

Aluminum foil alone does not adhere to the glass when heated to the temperature of the process of this invention.

Electron emission spectroscopy revealed the surface of the conducting film to a depth of 100 Angstroms contains aluminum, lead, silicon, oxygen, and carbon.

Prior art teaches that aluminum may be added to glass as the oxide during glass formulation. Prior art also teaches that metalic aluminum may be coated by deposition to form a conductive coating. Prior art, on the other hand, does not teach the formation of a conductive coating by fusing a glassy layer to the mother of glass by using the process or ingredients of the present invention.

GENERAL ASPECTS OF THE PRESENT INVENTION

The present invention consists of a process for producing a hard, electrically conductive film that is firmly adhered to the glass or porcelain on which it is made. By the process of this invention the film is both formed and caused to adhere firmly to the glass by placing a sheet, swatch or other flat piece of cellulosic material which has been treated by soaking in an aqueous plumbite solution against the surface of the glass, covering the cellulosic material with metallic aluminum in the form of foil or particles, placing the assembly in an oven at a temperature lower than 200°C., closing the oven, heating the oven to 600° to 700°C, and holding the oven at that temperature for about 60 minutes. The product may be removed from the oven after the heating period or it may have to be cooled some before removal. This depending not on the film produced by the process of this invention but on the heat-stress characteristics of the glass or porcelain on which the film is produced.

A specific application of the process would involve soaking a piece of cotton fabric in sodium plumbite solution prepared by reacting excess lead monoxide with 12% aqueous sodium hydroxide. The lead content of the cotton fabric will vary with length of time in the solution and is known from prior art. The plumbite-treated fabric is washed well with water to remove excess plumbite and dried. For purposes of the instant invention lead contents of the cotton fabric that vary from about 8% to about 37% can be used.

The plumbite-treated cotton fabric is cut to form the shape of the desired conductive surface and is placed flat against the surface of a glass object. Over and in contact with the cotton fabric is placed a piece of thin sheet metallic aluminum foil. This entire assembly is placed in an oven at ambient temperature, the oven door is closed and the oven temperature is raised to 700°C., and held there for about 60 minutes. The oven power is shut off and the oven allowed to cool to about ambient temperature and the product removed from the oven. No further treatment is required.

The product produced by the process of this invention is a hard glasslike, grey film that has very little resistance to the passage of electrical current through it. (Zero ohms measured by ohmmeter between two points on surface one inch apart). The film is thoroughly bonded to the glass surface or ceramic or other high silicon content surface.

A typical example to illustrate the electrically conductive glasslike films of this invention would be the case where a cotton fabric would be employed as the substrate upon which the sodium plumbite would be structured so as to contain about 25% of lead. This fabric, having in the finished product a 25% lead content, is used with aluminum foil so that the weight ratio of aluminum to lead to cotton is respectively about 1:2.5:7.5. The weight of the glass or ceramic on which the film is prepared is not a factor.

We claim:

1. A process for the preparation of glasslike, hard, electrically conductive films adhered firmly to and prepared on the surface of silicon-containing hard surfaces, the process comprising
    a. placing a sheet-type cellulosic material that has been treated with an aqueous sodium plumbite or potassium plumbite solution to contain about from 8% to 37% of lead, in contact with and flat against a high silicon content glass or ceramic surface,
    b. coating the sheet of (a) with metallic aluminum,
    c. inserting the assembled components of (b) into an oven preheated to a temperature below about 200°C,
    d. elevating the temperature of the closed oven to about from 600° to 700°C. thereafter maintaining said temperature for about 60 minutes, and
    e. cooling the oven and contents gradually to avoid the cracking of the assembled components due to thermal strain.

2. The process of claim 1 wherein the cellulosic material is cotton.

3. The process of claim 1 wherein the cellulosic material is cellulosic paper.

4. An electrically conductive film of about from 0.001 to 0.002 inches thickness deposited on and adhered to a glass or other high silicon containing hard surface produced by the process of claim 1.

* * * * *